US012662144B2

(12) United States Patent
Tamura et al.

(10) Patent No.: US 12,662,144 B2
(45) Date of Patent: Jun. 23, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Takao Tamura, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 308 days.

(21) Appl. No.: 18/369,305

(22) Filed: Sep. 18, 2023

(65) Prior Publication Data

US 2024/0092376 A1     Mar. 21, 2024

(30) Foreign Application Priority Data

Sep. 20, 2022     (JP) ................................. 2022-148976

(51) Int. Cl.
B60W 50/08     (2020.01)
B60W 30/12     (2020.01)
(52) U.S. Cl.
CPC ........... B60W 50/082 (2013.01); B60W 30/12 (2013.01); B60W 2552/30 (2020.02);
(Continued)
(58) Field of Classification Search
CPC ............... B60W 50/082; B60W 30/12; B60W 2552/30; B60W 2552/53;
(Continued)

(56) References Cited

U.S. PATENT DOCUMENTS 6,233,516 B1 * 5/2001 Egawa .................. B60W 30/16
                                                      356/3
11,928,871 B2 * 3/2024 Ishimaru ................... G06T 7/73
                              (Continued)

FOREIGN PATENT DOCUMENTS

JP         2017-061265         3/2017
JP         2019-038396         3/2019
                    (Continued)

OTHER PUBLICATIONS

Japanese Notice of Allowance for Japanese Patent Application No. 2022-148976 dated Dec. 22, 2023.

*Primary Examiner* — Jason Holloway
*Assistant Examiner* — Madison B Emmett
(74) *Attorney, Agent, or Firm* — Amin, Turocy & Watson, LLP

(57)                  ABSTRACT
A vehicle control device includes a first recognizer configured to recognize a surrounding situation of a vehicle including a first marking, a second recognizer configured to recognize a second marking relating to a lane near the vehicle from map information, a driving controller, and a mode decider. It is determined whether or not there is interference between a specific region set on the basis of the second marking and a position of the preceding vehicle when the first marking is not recognized and the preceding vehicle is recognized. A driving mode is changed from the first driving mode to the second driving mode when it is determined that the preceding vehicle interferes with the specific region. A width of the specific region is variably set in accordance with at least one of an inter-vehicle distance between the vehicle and the preceding vehicle and a road's curvature where the vehicle travels.

12 Claims, 9 Drawing Sheets

(52) U.S. Cl.
 CPC . *B60W 2552/53* (2020.02); *B60W 2554/4041* (2020.02); *B60W 2554/802* (2020.02); *B60W 2556/40* (2020.02); *B60W 2710/20* (2013.01); *B60W 2720/10* (2013.01)

(58) Field of Classification Search
 CPC ... B60W 2554/4041; B60W 2554/802; B60W 2556/40; B60W 2710/20; B60W 2720/10; B60W 30/182; B60W 30/16
 See application file for complete search history.

(56) References Cited

U.S. PATENT DOCUMENTS

| 12,187,284 | B2 * | 1/2025 | Kato | B60W 30/18163 |
| 12,459,505 | B2 * | 11/2025 | Tamura | B60W 30/12 |
| 2002/0099491 | A1 * | 7/2002 | Akabori | B60W 30/16 |
| | | | | 180/170 |
| 2013/0166150 | A1 * | 6/2013 | Han | B60W 10/18 |
| | | | | 701/41 |
| 2016/0059856 | A1 * | 3/2016 | Van Dan Elzen | B60W 30/12 |
| | | | | 701/41 |
| 2018/0037226 | A1 * | 2/2018 | Otake | B60K 28/06 |
| 2019/0061808 | A1 | 2/2019 | Mizoguchi | |

| 2019/0092330 | A1 * | 3/2019 | Ide | G01S 13/66 |
| 2019/0138002 | A1 * | 5/2019 | Mimura | B60W 50/14 |
| 2019/0215671 | A1 * | 7/2019 | Takii | H04L 51/58 |
| 2019/0283757 | A1 * | 9/2019 | Honda | G05D 1/0088 |
| 2019/0351906 | A1 * | 11/2019 | Oh | B60W 30/16 |
| 2020/0207346 | A1 | 7/2020 | Tsuji et al. | |
| 2020/0247408 | A1 * | 8/2020 | Lim | B60W 30/18072 |
| 2021/0291830 | A1 * | 9/2021 | Tamura | G06V 20/588 |
| 2022/0258727 | A1 * | 8/2022 | Maruiwa | B62D 15/0285 |
| 2022/0309804 | A1 * | 9/2022 | Inoue | G06V 10/809 |
| 2022/0388533 | A1 | 12/2022 | Tamura et al. | |
| 2023/0068472 | A1 * | 3/2023 | Kawasaki | G06V 20/56 |
| 2023/0174060 | A1 * | 6/2023 | Oguro | G06V 20/588 |
| 2023/0303099 | A1 | 9/2023 | Inoue et al. | |
| 2023/0347942 | A1 | 11/2023 | Kobayashi et al. | |
| 2024/0199010 | A1 * | 6/2024 | Shimizu | B60W 30/12 |
| 2024/0199030 | A1 * | 6/2024 | Tamura | B60W 40/06 |

FOREIGN PATENT DOCUMENTS

| JP | 2020-050086 | 4/2020 |
| JP | 2020-104802 | 7/2020 |
| JP | 2022-185787 | 12/2022 |
| JP | 2023-139737 | 10/2023 |
| WO | 2022/144957 | 7/2022 |

* cited by examiner

FIG. 3

| DRIVING MODE | CONTROL STATE | TASK |
|---|---|---|
| MODE A | AUTOMATED DRIVING | SURROUNDINGS MONITORING:UNNECESSARY STEERING GRIP:UNNECESSARY |
| MODE B | DRIVING ASSISTANCE | SURROUNDINGS MONITORING:NECESSARY STEERING GRIP:UNNECESSARY |
| MODE C | DRIVING ASSISTANCE | SURROUNDINGS MONITORING:NECESSARY STEERING GRIP:NECESSARY |
| MODE D | DRIVING ASSISTANCE | SURROUNDINGS MONITORING:NECESSARY AT LEAST CERTAIN DEGREE OF DRIVING OPERATION IS NECESSARY |
| MODE E | MANUAL DRIVING | SURROUNDINGS MONITORING:NECESSARY DRIVING OPERATION IS NECESSARY FOR BOTH STEERING AND ACCELERATION/DECELERATION |

TASK:LIGHT

TASK:HEAVY

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2022-148976, filed Sep. 20, 2022, the content of which is incorporated herein by reference.

BACKGROUND

Field of the Invention

The present invention relates to a vehicle control device, a vehicle control method, and a storage medium.

Description of Related Art

In recent years, efforts to provide access to sustainable transportation systems have been increasingly active in consideration of vulnerable individuals among participants in transportation. In pursuit of this realization, research and development on driving assistance technology are being emphasized to further improve the safety and convenience of transportation. In relation to this, conventional technologies have been disclosed as technology for switching between traveling based on a lane mark and traveling based on a trajectory of a preceding vehicle in accordance with a degree of recognition of the lane mark and technology for executing traveling control based on a lane-keeping assistance system for preventing a vehicle from deviating from its travel lane on the basis of a result of recognizing a road marking based on a camera or map information, previous lane information, and a travel trajectory of a preceding vehicle (for example, see Japanese Unexamined Patent Application, First Publication No. 2020-50086 and Japanese Unexamined Patent Application, First Publication No. 2017-61265).

SUMMARY

Meanwhile, in driving assistance technologies, when traveling is performed on the basis of a road marking and a travel trajectory of a preceding vehicle, driving control may not be appropriately performed according to recognition accuracy of a detection device that detects a surrounding situation of a vehicle, the accuracy of a position of a host vehicle, and the like. Thus, there is a possibility that appropriate driving assistance cannot be provided to occupants of a vehicle in accordance with a surrounding condition.

In order to solve the above problems, an objective of the present application is to provide a vehicle control device, a vehicle control method, and a storage medium that can provide more appropriate driving assistance to occupants of a vehicle in accordance with a surrounding situation. By extension, it also contributes to the development of a sustainable transportation system.

A vehicle control device, a vehicle control method, and a storage medium according to the present invention adopt the following configurations.

(1): According to an aspect of the present invention, there is provided a vehicle control device including: a first recognizer configured to recognize a surrounding situation of a vehicle including a first marking relating to a travel lane of the vehicle and a nearby vehicle around the vehicle on the basis of an output of a detection device that detects the surrounding situation of the vehicle; a second recognizer configured to recognize a second marking relating to a lane near the vehicle from map information on the basis of position information of the vehicle; a driving controller configured to control one or both of steering and a speed of the vehicle on the basis of recognition results of the first recognizer and the second recognizer; and a mode decider configured to decide on a driving mode of the vehicle as any one of a plurality of driving modes including a first driving mode and a second driving mode having a heavier task imposed on an occupant of the vehicle than the first driving mode, wherein some of the plurality of driving modes including at least the first driving mode are controlled by the driving controller, wherein the mode decider determines whether or not there is interference between a specific region set on the basis of the second marking recognized by the second recognizer and a position of the preceding vehicle when the first recognizer recognizes the preceding vehicle traveling in front of the vehicle without recognizing the first marking, and changes the driving mode from the first driving mode to the second driving mode when determining that the preceding vehicle interferes with the specific region, and wherein a width of at least a part of the specific region is variably set in accordance with at least one of an inter-vehicle distance between the vehicle and the preceding vehicle and curvature of a road where the vehicle travels.

(2): In the above-described aspect (1), the specific region is set so that the width becomes wider toward a center of a travel lane of the vehicle as the inter-vehicle distance increases.

(3): In the above-described aspect (1), a width of at least a part of the specific region is variably set so that the width becomes wider toward a center of a travel lane of the vehicle as curvature of a travel lane of the vehicle increases.

(4): In the above-described aspect (1), a width of at least a part of the specific region is variably set in accordance with a deviation angle between an extension direction of the second marking and a travel direction of the preceding vehicle or a shortest distance between the preceding vehicle and the second marking.

(5): In the above-described aspect (1), an allowable region is provided between the second marking and the specific region, and the mode decider causes the first driving mode to continue when the preceding vehicle is located within the allowable region.

(6): In the above-described aspect (5), the mode decider causes the vehicle to travel in the second driving mode when a state in which a position of the preceding vehicle is located within the allowable region continues for a prescribed period of time or longer.

(7): In the above-described aspect (1), the mode decider switches the driving mode to the second driving mode when the preceding vehicle is absent and switches the driving mode to a manual driving mode when a state of the second driving mode has continued for a prescribed period of time or longer.

(8): In the above-described aspect (1), the mode decider executes the first driving mode on the basis of the second marking and a travel trajectory of the preceding vehicle when the first recognizer recognizes the preceding vehicle without recognizing the first marking, and switches the driving mode to the first driving mode based on the first marking when the first recognizer recognizes the first marking while the first driving mode is being executed.

(9): In the above-described aspect (1), the mode decider continues the first driving mode based on a travel trajectory of another vehicle and the second marking in a case where the other vehicle which is another tracking target is present as a case where the preceding vehicle is not recognized as a tracking target while the first driving mode based on the travel trajectory of the preceding vehicle and the second marking is being executed.

(10): According to another aspect of the present invention, there is provided a vehicle control method including: recognizing, by a computer, a surrounding situation of a vehicle including a first marking relating to a travel lane of the vehicle and a nearby vehicle around the vehicle on the basis of an output of a detection device that detects the surrounding situation of the vehicle; recognizing, by the computer, a second marking relating to a lane near the vehicle from map information on the basis of position information of the vehicle; performing, by the computer, driving control for controlling one or both of steering and a speed of the vehicle on the basis of recognition results; deciding, by the computer, on a driving mode of the vehicle as any one of a plurality of driving modes including a first driving mode and a second driving mode having a heavier task imposed on an occupant of the vehicle than the first driving mode, wherein some of the plurality of driving modes including at least the first driving mode are controlled in the driving control; determining, by the computer, whether or not there is interference between a specific region set on the basis of the second marking and a position of the preceding vehicle when the first marking is not recognized and the preceding vehicle traveling in front of the vehicle is recognized; and changing, by the computer, the driving mode from the first driving mode to the second driving mode when determining that the preceding vehicle interferes with the specific region, wherein a width of at least a part of the specific region is variably set in accordance with at least one of an inter-vehicle distance between the vehicle and the preceding vehicle and curvature of a road where the vehicle travels.

(11): According to yet another aspect of the present invention, there is provided a computer-readable non-transitory storage medium storing a program for causing a computer to: recognize a surrounding situation of a vehicle including a first marking relating to a travel lane of the vehicle and a nearby vehicle around the vehicle on the basis of an output of a detection device that detects the surrounding situation of the vehicle; recognize a second marking relating to a lane near the vehicle from map information on the basis of position information of the vehicle; perform driving control for controlling one or both of steering and a speed of the vehicle on the basis of recognition results; decide on a driving mode of the vehicle as any one of a plurality of driving modes including a first driving mode and a second driving mode having a heavier task imposed on an occupant of the vehicle than the first driving mode, wherein some of the plurality of driving modes including at least the first driving mode are controlled in the driving control; determine whether or not there is interference between a specific region set on the basis of the second marking and a position of the preceding vehicle when the first marking is not recognized and the preceding vehicle traveling in front of the vehicle is recognized; and change the driving mode from the first driving mode to the second driving mode when determining that the preceding vehicle interferes with the specific region, wherein a width of at least a part of the specific region is variably set in accordance with at least one of an inter-vehicle distance between the vehicle and the preceding vehicle and curvature of a road where the vehicle travels.

According to the above-described aspects (1) to (11), it is possible to provide driving assistance more suitable for an occupant of a vehicle in accordance with a surrounding situation.

BRIEF DESCRIPTION OF THE DRAWINGS

FIG. 3 is a diagram showing an example of relationships between driving modes, control states of a vehicle, and tasks.

DESCRIPTION OF EMBODIMENTS

Figure 1:
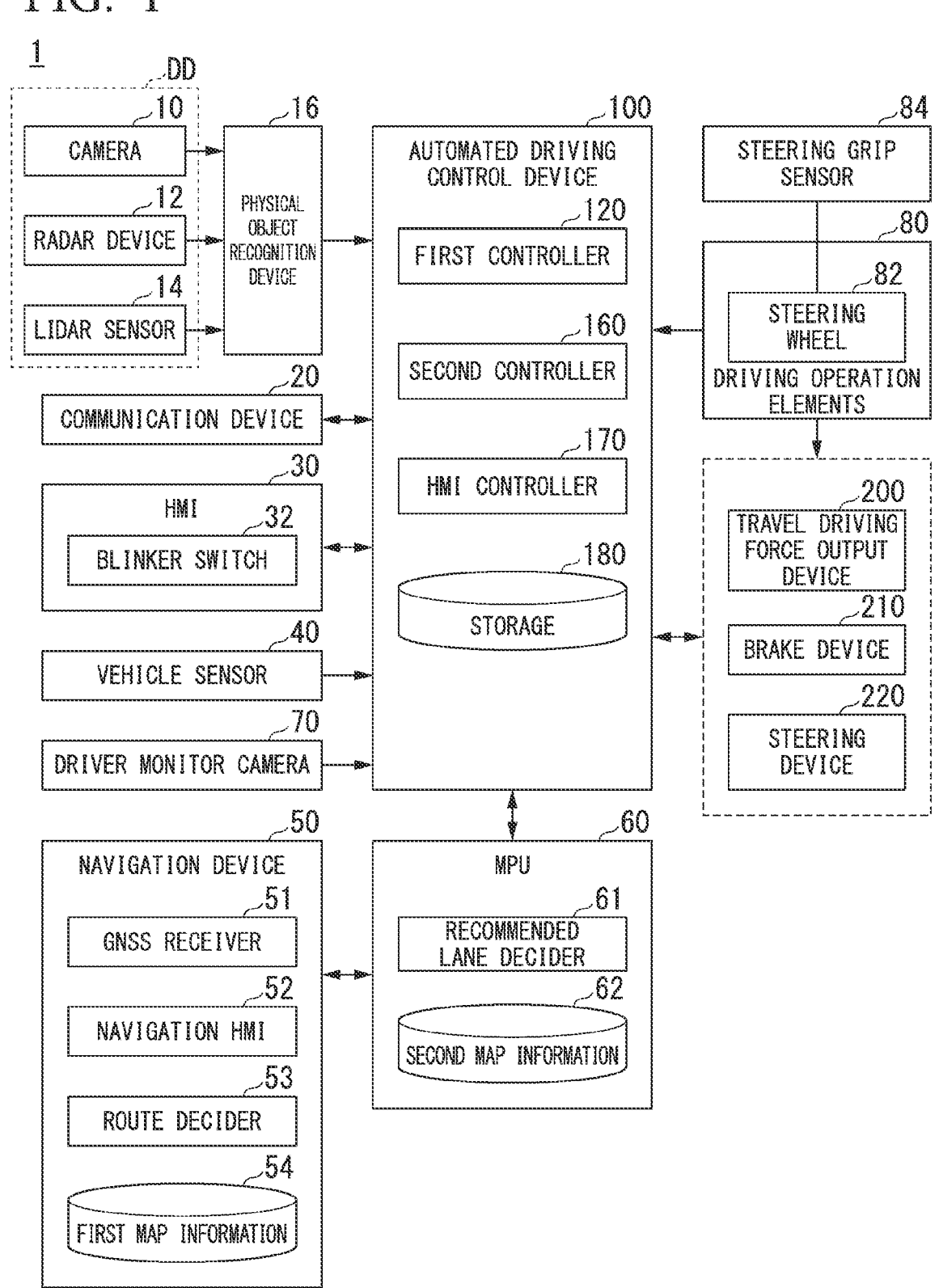
FIG. 1 is a configuration diagram of a vehicle system using a vehicle control device according to an embodiment.

Hereinafter, embodiments of a vehicle control device, a vehicle control method, and a storage medium of the present invention will be described with reference to the drawings.
[Overall Configuration]
FIG. 1 is a configuration diagram of a vehicle system 1 using the vehicle control device according to the present embodiment. A vehicle (hereinafter referred to as a vehicle M) in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery or a fuel cell is discharged. Hereinafter, an embodiment in which the vehicle control device is applied to an automated driving vehicle will be described as an example. For example, automated driving is a process of executing driving control by automatically controlling one or both of steering and a speed (acceleration/deceleration) of the vehicle M. For example, the driving control of the vehicle M may include various types of driving assistance such as a lane keeping assistance system (LKAS), auto lane changing (ALC), adaptive cruise control (ACC), auto lane changing assist (ALCA), deceleration control before a curve road, curve road departure suppression, and merging assist (merging yield). In the automated driving vehicle, a part or all of the driving may be controlled according to manual driving of an occupant (a driver).

For example, the vehicle system 1 includes a camera (an example of an imager) 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. A combination of the camera 10, the radar device 12, and the LIDAR sensor 14 is an example of a "detection device DD." In the detection device DD, another detector (for example, a sound navigation and ranging (SONAR) sensor) for recognizing a surrounding situation of a vehicle may be included or the physical object recognition device 16 may be included. The HMI 30 is an example of an "output device." The automated driving control device 100 is an example of a "vehicle control device."

For example, the camera 10 is a digital camera using a solid-state imaging element such as a charge-coupled device (CCD) or a complementary metal oxide semiconductor (CMOS). The camera 10 is attached to any position on the vehicle M. For example, when the view in front of the vehicle M is imaged, the camera 10 is attached to an upper part of a front windshield, a rear surface of a rearview mirror, or the like. When the view to the rear of the vehicle M is imaged, the camera 10 is attached to an upper part of a rear windshield, a back door, or the like. When the views to the side and the rear side of the vehicle M are imaged, the camera 10 is attached to an upper part of a rear windshield, a door mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any location on the vehicle M. The radar device 12 may detect a position and a speed of the physical object in a frequency-modulated continuous wave (FM-CW) scheme.

The LIDAR sensor 14 radiates light (or electromagnetic waves having a wavelength close to light) to the vicinity of the vehicle M and measures scattered light. The LIDAR sensor 14 detects a distance from an object on the basis of time from light emission to light reception. The radiated light is, for example, pulsed laser light. The LIDAR sensor 14 is attached to any location on the vehicle M.

The physical object recognition device 16 performs a sensor fusion process on detection results from some or all of the camera 10, the radar device 12, and the LIDAR sensor 14 included in the detection device DD to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle located in the vicinity of the vehicle M using, for example, a cellular network, a Wi-Fi network, Bluetooth (registered trademark), dedicated short-range communication (DSRC), or the like, or communicates with various types of server devices via a radio base station.

The HMI 30 presents various types of information to the occupant of the vehicle M according to control of the HMI controller 170 and receives input operations from the occupant. The HMI 30 includes, for example, various types of display devices, a speaker, a switch, a microphone, a buzzer, a touch panel, a key, and the like. The various types of display devices are, for example, a liquid crystal display (LCD), an organic electro luminescence (EL) display device, and the like. The display device is provided, for example, near the front of the driver's seat (the seat closest to a steering wheel) on an instrument panel, and is installed at a position where the occupant can perform visual recognition from the steering wheel gap or through the steering wheel. The display device may be installed at the center of the instrument panel. The display device may be a head-up display (HUD). The HUD projects an image onto a part of the front windshield in front of the driver's seat so that the eyes of the occupant sitting in the driver's seat can see the virtual image. The display device displays an image generated by the HMI controller 170 to be described below. The HMI 30 may include an operation changeover switch or the like that mutually switches between automated driving and manual driving by the occupant. The switch includes, for example, a blinker switch (direction indicator) 32. The blinker switch 32 is provided, for example, on the steering column or the steering wheel. The blinker switch 32 is an example of an operation portion that receives an instruction to make a lane change of the vehicle M from the occupant.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like. The vehicle sensor 40 may include a steering angle sensor configured to detect a steering angle of the vehicle M (which may be an angle of the steering wheel or an operating angle of the steering wheel). The vehicle sensor 40 may include a position sensor configured to acquire the position of the vehicle M. The position sensor is, for example, a sensor configured to acquire position information (longitude/latitude information) from a Global Positioning System (GPS) device. The position sensor may be a sensor configured to acquire position information using a global navigation satellite system (GNSS) receiver 51 of the navigation device 50.

For example, the navigation device 50 includes the GNSS receiver 51, a navigation HMI 52, and a route decider 53. The navigation device 50 stores first map information 54 in a storage device such as a hard disk drive (HDD) or a flash memory. The GNSS receiver 51 identifies a position of the vehicle M on the basis of a signal received from a GNSS satellite. The position of the vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature (a curvature radius) of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and stores second map information 62 in a storage device such as an HDD or a flash memory. The recommended lane decider 61 divides the route on the map provided from the navigation device 50 into a plurality of blocks (for example, divides the route every 100 [m] in a travel direction of the vehicle), and decides on a recommended lane for each block with reference to the second map information 62. The recommended lane decider 61 decides in what lane numbered from the left the vehicle will travel. For example, the recommended lane decider 61 decides on the recommended lane so that the vehicle M can travel along a reasonable route for traveling to a branching destination when there is a branch point on the route on the map.

The second map information 62 is map information which has higher accuracy than the first map information 54. For example, the second map information 62 includes, for example, information of the center of a lane (a lane centerline), a lane boundary (a road marking), the number of lanes, branch/merging points, and the like. The second map information 62 may include road information, traffic regulations information, address information (an address/postal code), facility information, telephone number information, and the like. The second map information 62 may be updated at any time when the communication device 20 communicates with another device.

The driver monitor camera 70 is, for example, a digital camera that uses a solid-state image sensor such as a CCD or a CMOS. The driver monitor camera 70 is, for example, attached to any location on the vehicle M with respect to a position and a direction where the head of the occupant (hereinafter, the driver) sitting in the driver's seat of the vehicle M can be imaged from the front (in a direction in which his/her face is imaged). For example, the driver monitor camera 70 is attached to an upper part of a display device provided on the central portion of the instrument panel of the vehicle M.

For example, the driving operation elements 80 include an accelerator pedal, a brake pedal, a shift lever, and other operation elements in addition to a steering wheel 82. A sensor configured to detect an amount of operation or the presence or absence of an operation is attached to the driving operation element 80 and a detection result of the sensor is output to the automated driving control device 100 or some or all of the travel driving force output device 200, the brake device 210, and the steering device 220. The steering wheel 82 is an example of an "operation element that receives a steering operation by the driver." The operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that the driver is in contact with the steering wheel 82 in a state in which a force is applied) to the automated driving control device 100.

The automated driving control device 100 includes, for example, a first controller 120, a second controller 160, an HMI controller 170, and a storage 180. Each of the first controller 120, the second controller 160, and the HMI controller 170 is implemented, for example, by a hardware processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. A combination of the action plan generator 140 and the second controller 160 is an example of a "driving controller." The HMI controller 170 is an example of an "output controller."

The storage 180 may be implemented by the above-described various storage devices, a solid-state drive (SSD), an electrically erasable programmable read-only memory (EEPROM), a read-only memory (ROM), a random-access memory (RAM), or the like. The storage 180 stores, for example, programs, various other types of information, and the like. The storage 180 may store map information (the first map information 54 and the second map information 62).

Figure 2:
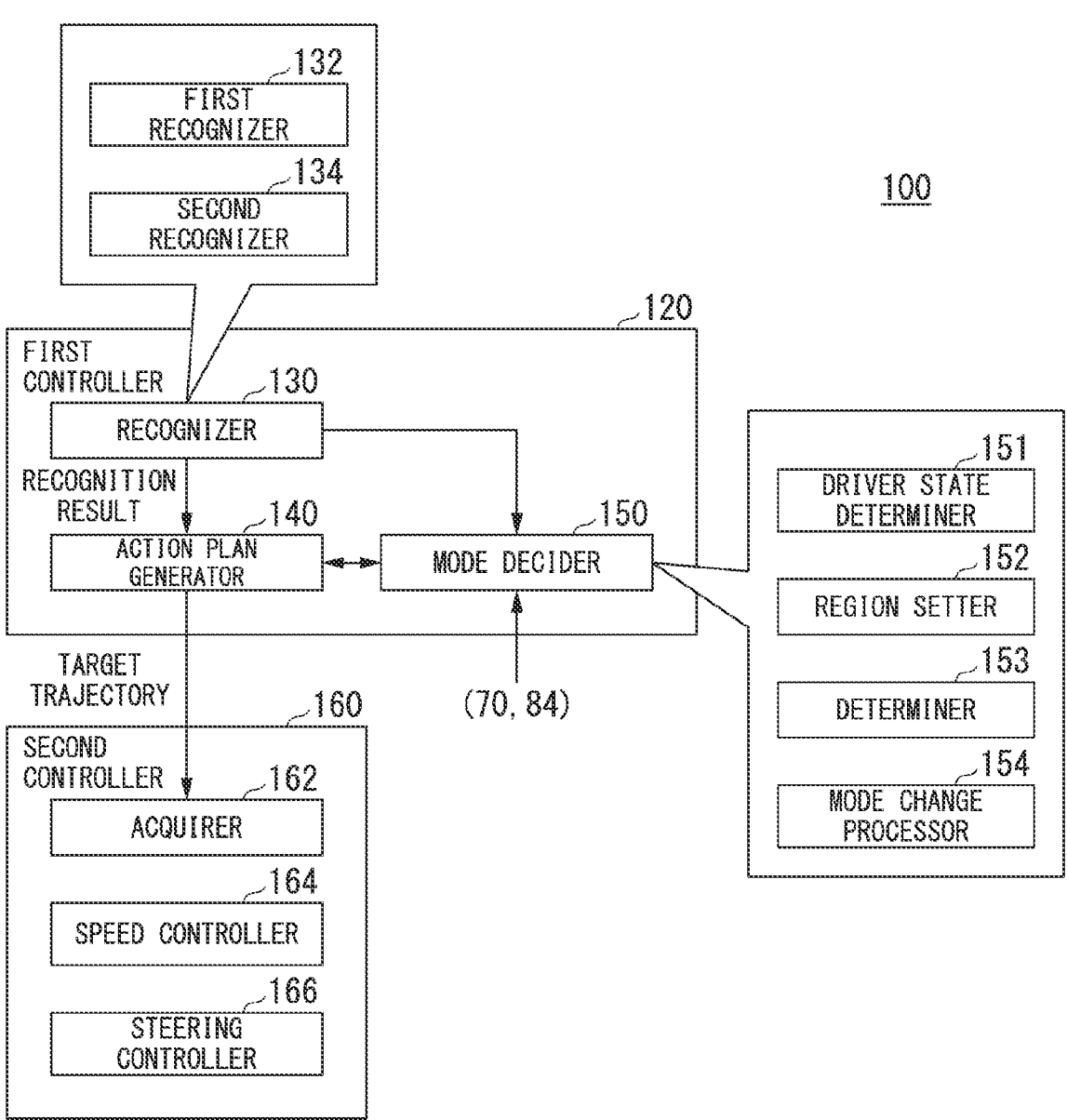
FIG. 2 is a functional configuration diagram of a first controller and a second controller according to the embodiment.

FIG. 2 is a functional configuration diagram of the first controller 120 and the second controller 160 according to the embodiment. The first controller 120 includes, for example, a recognizer 130, an action plan generator 140, and a mode decider 150. The first controller 120 implements, for example, a function of artificial intelligence (AI) and a function of a predetermined model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both recognitions. Thereby, the reliability of automated driving is secured.

The recognizer 130 recognizes a surrounding situation of the vehicle M on the basis of an output of the detection device DD. For example, the recognizer 130 recognizes, for example, a lane in which the vehicle M travels (a travel lane), curvature (or a curvature radius) of the travel lane (or a road including the travel lane), other vehicles (nearby vehicles), and the like. Here, the recognizer 130 includes, for example, a first recognizer 132 and a second recognizer 134.

The first recognizer 132, for example, recognizes left and right road markings based on the vehicle M (as viewed from the vehicle M) from an image captured by the camera 10 (hereinafter referred to as a camera image) and recognizes a travel lane on the basis of positions of the recognized road markings. The first recognizer 132 may recognize adjacent lanes adjacent to the travel lane on the basis of the recognized road markings. The first recognizer 132 is not limited to road markings, and may recognize the travel lane by recognizing a target (a runway boundary or a road boundary) for identifying lane positions including a road shoulder, a curb, a median strip, a guardrail, a fence, a wall, and the like from analysis results of the camera image. Hereinafter, the road markings recognized from the camera image by the first recognizer 132 are referred to as "camera markings." A camera marking is an example of a "first marking."

The first recognizer 132 recognizes states of a position (a relative position for the vehicle M), a velocity (a relative velocity for the vehicle M), acceleration, and the like of a physical object (for example, another vehicle, a pedestrian, or the like) located near the vehicle M (within a prescribed distance from the vehicle M) on the basis of an output of the detection device DD that detects the surrounding situation of the vehicle M. The position of the physical object is recognized, for example, as a position on absolute coordinates with a representative point (a center of gravity, a center of a drive shaft, or the like) of the vehicle M as the origin, and used for control. The position of the physical object may be represented by a representative point such as a center of gravity or a corner of the physical object or may be represented by a region. The "state" of a physical object may include acceleration or jerk of the physical object or an "action state" (for example, whether or not a lane change is being made or intended). The first recognizer 132 may recognize a relative position or distance of a preceding vehicle traveling in front of the vehicle M (within a prescribed distance in front thereof), an angle (a deviation angle) of a travel direction of the preceding vehicle based on an extension direction of a travel lane (a road including the travel lane), and the like on the basis of the output of the detection device DD. The first recognizer 132 may recognize a travel trajectory of the preceding vehicle. The first recognizer 132 may recognize a temporary stop line, an obstacle, red traffic light, a toll gate, and other road events.

The first recognizer 132 recognizes a position or a posture of the vehicle M for the travel lane when the travel lane is recognized. The first recognizer 132, for example, may recognize the deviation of the reference point of the vehicle M from the center of the lane and an angle formed between a travel direction of the vehicle M and a line connected to the center of the lane as the relative position or posture of the vehicle M for the travel lane. Instead of this, the first recognizer 132 may recognize the position of the reference point of the vehicle M (or another vehicle) or the like for either side edge (a road marking or a road boundary) of the travel lane as a relative position of the vehicle M (or another vehicle) for the travel lane.

The first recognizer 132 recognizes a preceding vehicle located in front of the vehicle M and traveling within a prescribed distance from the vehicle M among other vehicles located near the vehicle M. When there are a plurality of preceding vehicles, the closest preceding vehicle from the vehicle M may be recognized.

The second recognizer 134, for example, recognizes lanes around the vehicle M including a travel lane in which the vehicle M travels with reference to map information (for example, the first map information 54 and the second map information 62) on the basis of the position of the vehicle M detected by the vehicle sensor 40 or the GNSS receiver 51. The second recognizer 134 may recognize road markings for defining the travel lane or may recognize an adjacent lane that is adjacent to the travel lane or road markings for defining the adjacent lane. The second recognizer 134 may recognize a centerline (a lane centerline) and curvature (or a radius of curvature) of the travel lane or the adjacent lane from the map information. Hereinafter, the road markings recognized from the map information by the second recognizer 134 are referred to as "map markings." The map markings may include lane centerlines. A map marking is an example of a "second marking."

The action plan generator 140 generates a future target trajectory along which the vehicle M will automatically travel (independently of the driver's operation) so that the vehicle M can generally travel in the recommended lane determined by the recommended lane decider 61 and further cope with a surrounding situation of the vehicle M. For example, the target trajectory includes a speed element. For example, the target trajectory is represented by sequentially arranging points (trajectory points) at which the vehicle M is required to arrive. The trajectory points are points at which the vehicle M is required to arrive for each prescribed traveling distance (for example, about several meters [m]) along a road. In addition, a target speed and target acceleration for each prescribed sampling time (for example, about 0.x [sec] where x is a decimal number) are generated as parts of the target trajectory. Also, the trajectory point may be a position where the vehicle M is required to arrive at the sampling time for each prescribed sampling time. In this case, information of the target speed or the target acceleration is represented by an interval between the trajectory points.

The action plan generator 140 may set an automated driving event (function) when a target trajectory is generated. Automated driving events include a constant-speed travel event, a low-speed tracking travel event, a lane change event, a branch-point-related movement event, a merging-point-related movement event, a takeover event, and the like. The action plan generator 140 generates a target trajectory according to an activated event. The action plan generator 140 generates a target trajectory so that driving control corresponding to content decided on by the mode decider 150 can be executed.

The mode decider 150 sets the driving mode of the vehicle M as any one of a plurality of driving modes with different tasks imposed on the driver (in other words, a plurality of modes with different degrees of automation of driving control (control degrees)). The mode decider 150 controls the driving controller so that the vehicle travels in the decided driving mode. The mode decider 150 includes, for example, a driver state determiner 151, a region setter 152, a determiner 153, and a mode change processor 154. Details of these functions will be described below.

FIG. 3 is a diagram showing an example of relationships between driving modes, control states of the vehicle M, and tasks. In the example of FIG. 3, the driving modes of the vehicle M include, for example, five modes from mode A to mode E. In FIG. 3, mode B is an example of a "first driving mode" and modes C and D are examples of a "second driving mode." Mode A may be included in the first driving mode. The driving modes may include modes other than modes A to E and may include driving modes other than the first driving mode and the second driving mode. In modes A to E, a control state, i.e., a degree of automation of the driving control of the vehicle M, is highest in mode A, lower in the order of mode B, mode C, and mode D, and lowest in mode E. In contrast, a task imposed on the occupant (the driver) is lightest in mode A, heavier in the order of mode B, mode C, and mode D, and heaviest in mode E in which manual driving is performed. Because of a control state that is not automated driving in modes B to E, the automated driving control device 100 is responsible for ending control relating to automated driving and shifting the driving mode to driving assistance or manual driving. The mode decider 150 decides on any one of a plurality of driving modes including the first driving mode and the second driving mode shown in FIG. 3. The driving controller controls at least one of steering and a speed (acceleration/deceleration) of the vehicle M to cause the vehicle M to travel in some of the plurality of driving modes including at least the first driving mode. The content of each mode is exemplified below.

In mode A, in an automated driving state, neither surroundings monitoring nor gripping of the steering wheel 82 (hereinafter referred to as a steering grip) is imposed on the occupant. Surroundings monitoring includes at least monitoring in the travel direction of the vehicle M (for example, a forward direction). A space in the forward direction is a space in the travel direction of the vehicle M that is visually recognized through the front windshield. However, in mode A as well, the occupant is required to be in a posture in which driving can be quickly shifted to manual driving in response to a request from a system centering on the automated driving control device 100. The term "automated driving" as used herein indicates that both steering and a speed of the vehicle M are controlled independently of the operation of the occupant. Mode A is, for example, a driving mode in which the vehicle M travels at a prescribed speed (for example, about 50 [km/h]) or lower on a motorway such as an expressway and which can be executed when a condition in which there is a preceding vehicle, which is tracking target, or the like is satisfied. Mode A may be referred to as a traffic jam pilot (TJP). When this condition is no longer satisfied, the mode decider 150 changes the driving mode of the vehicle M to mode B.

While mode A is being executed, the occupant can perform a second task. The second task is, for example, an action other than driving of the occupant that is allowed during automated driving of the vehicle M. The second task includes, for example, television watching, the use of a terminal device (for example, a smartphone and a tablet terminal) possessed by the occupant (for example, the communication of a phone call, the transmission and reception of email, the use of a social networking service (SNS), the browsing of Web, or the like), eating, and the like.

In mode B, in a driving assistance state, a task of monitoring surroundings of the vehicle M (hereinafter referred to as surroundings monitoring) is imposed on the occupant, but a task of gripping the steering wheel 82 is not imposed on the occupant. For example, in mode B, in a state in which a lane change instruction is not received from the occupant (in a state in which a driving operation is not received from the occupant), a lane change (ALC) of the vehicle M based on the route setting to the destination by the navigation device 50 or the like is performed according to the determination of the vehicle system 1 side. The lane change is movement of the vehicle M from a travel lane (a host vehicle lane) of the vehicle M to an adjacent lane and may include a lane change based on branching or merging. A driving entity in modes A and B is the vehicle system 1. In mode B, the lane change (ALCA) may be executed by the driving controller after the instruction is received from the occupant.

In mode C, in the driving assistance state, the task of monitoring the surroundings and gripping the steering wheel 82 is imposed on the occupant. For example, in mode C, when the vehicle system 1 determines that the lane change of the vehicle M is necessary, an inquiry is sent to the occupant via the HMI 30 and the driving assistance (an example of ALCA) for making the lane change is performed when the occupant's approval of the lane change is received from the HMI 30 or the like. Lane change control in mode B and mode C is a lane change by the system entity.

Mode D is a driving mode in which a certain degree of driving operation of the occupant is required in relation to at least one of steering and acceleration/deceleration of the vehicle M. For example, in mode D, driving assistance such as adaptive cruise control (ACC) and a lane-keeping assist system (LKAS) is performed. In mode D, when an instruction to make a lane change of the vehicle M has been received from the driver operating the blinker switch 32, driving assistance (an example of ALCA) in which the lane change is made in an instruction direction is performed. The lane change in mode D is a lane change intended by the occupant. The occupant's operation on the blinker switch 32 is an example of a driving operation. Driving operations of mode D may include a driving operation for controlling steering or acceleration/deceleration.

In mode E, both the steering and acceleration/deceleration of the vehicle M are in a manual driving state in which a driving operation of the occupant is required (a so-called manual driving mode). In both mode D and mode E, the occupant is naturally required to monitor the surroundings of the vehicle M. The driving entity in modes C to E is the occupant (the driver).

The mode decider 150 changes the driving mode of the vehicle M to a driving mode in which a task is heavier when the task associated with the decided driving mode is not executed by the driver.

For example, while mode A is being executed, when the occupant is in a posture in which he/she cannot shift the driving to manual driving in response to a request from the system (for example, when he/she continues to look outside an allowable area or when a sign that driving is difficult is detected), the mode decider 150 causes a control process of prompting the occupant to shift the driving to manual driving of mode E using the HMI 30 to be executed by the HMI controller 170. The mode decider 150 performs a control process of causing the vehicle M to gradually decelerate while approaching a target position (for example, a road shoulder) and stopping the automated driving when the occupant does not respond even if a prescribed period of time elapses after a control process of prompting the HMI controller 170 to shift driving to manual driving is executed or when it is estimated that the occupant is not in a state in which manual driving is performed. After the automated driving is stopped, the vehicle M is in a state of mode D or E. Thereby, the vehicle M can be started according to the manual operation of the occupant. Hereinafter, the same is true for "stopping of automated driving."

When the occupant is not performing forward monitoring in mode B, the mode decider 150 performs a control process of prompting the occupant to perform the forward monitoring using the HMI 30, causing the vehicle M to gradually stop close to a target position when the occupant does not respond, and stopping the automated driving. When the occupant is not performing forward monitoring or is not gripping the steering wheel 82 in mode C, the mode decider 150 performs a control process of prompting the occupant to perform the forward monitoring and/or grip the steering wheel 82 using the HMI 30, causing the vehicle M to gradually stop close to a target position when the occupant does not respond, and stopping the automated driving.

The driver state determiner 151 determines whether or not the occupant (the driver) is in a state suitable for driving. For example, the driver state determiner 151 monitors the state of the occupant for the above-described mode change and determines whether or not the state of the occupant corresponds to the task. For example, the driver state determiner 151 performs a posture estimation process by analyzing an image captured by the driver monitor camera 70 and determines whether or not the occupant is in a posture in which he/she cannot shift the driving to manual driving in response to a request from the system. The driver state determiner 151 performs a visual line estimation process by analyzing the image captured by the driver monitor camera 70 and determines whether or not the occupant is monitoring the surroundings (more specifically, the forward direction) of the vehicle M. When it is determined that the occupant is not in a state corresponding to the task for the predetermined time or longer, the driver state determiner 151 determines that the occupant is not in a state suitable for driving of the task. When it is determined that the state corresponds to the task, the driver state determiner 151 determines that the occupant is in a state suitable for driving of the task. The driver state determiner 151 may determine whether or not the occupant is in a state in which it is possible to change driving.

The region setter 152 sets a specific region on the basis of the map markings recognized by the second recognizer 134. For example, the region setter 152 may set the specific region when the camera markings are not recognized by the first recognizer 132 (or when driving control based on the map markings is being executed), when the camera markings do not match the map markings (when a deviation degree in a distance or angle between the markings is greater than or equal to a threshold value), or the like. The specific region is, for example, a region used to decide on the driving control (the driving mode) to be executed for the vehicle M. The specific region may be set as a reference on the basis of each of the left and right map markings for defining the travel lane where the vehicle M travels as seen from the vehicle M or may set one map marking (for example, a map marking closer to a preceding vehicle) as a reference. The region setter 152 may set the allowable region in addition to the specific region. Details of the specific region and the allowable region will be described below.

When the preceding vehicle in front of the vehicle M is recognized by the first recognizer 132, the determiner 153 determines whether or not there is interference between the specific region set by the region setter 152 and the position of the preceding vehicle. Here, the "interference between the specific region and the position of the preceding vehicle" includes, for example, a case where at least a part of the preceding vehicle is included in the specific region or is predicted to be included in the specific region in the future (within a prescribed period of time). For example, when the first marking is not recognized by the first recognizer 132 and the preceding vehicle is recognized, the determiner 153 determines whether or not there is interference between the specific region and the position of the preceding vehicle.

The mode change processor 154 decides on the driving mode of the vehicle M on the basis of determination results of the driver state determiner 151, the determiner 153, and the like. The mode change processor 154 may decide to continue the driving mode being executed or to switch the mode to another mode. The mode decider 150, for example, may decide on content of the driving assistance to be executed by the driving controller (the driving assistance to be provided to the occupant of the vehicle M by the driving controller).

The mode change processor 154 performs various types of processes for making a change to the driving mode decided on by the mode decider 150. For example, the mode change processor 154 issues an operation instruction to a driving assistance device (not shown), causes information for prompting the occupant to take action corresponding to the task to be output from HMI controller 170 to the HMI 30, and issues an instruction for generating a target trajectory based on the action plan generator 140 corresponding to the driving mode. Specific processing content of the region setter 152, the determiner 153, and the mode change processor 154 will be described below.

The second controller 160 controls the travel driving force output device 200, the brake device 210, and the steering device 220 so that the vehicle M passes a target trajectory generated by the action plan generator 140 at the scheduled time.

The second controller 160 includes, for example, an acquirer 162, a speed controller 164, and a steering controller 166. The acquirer 162 acquires information of the target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of curvature of the target trajectory stored in the memory. The processes of the speed controller 164 and the steering controller 166 are implemented by, for example, a combination of feedforward control and feedback control. As an example, the steering controller 166 performs a combination of feedforward control corresponding to the curvature of the road in front of the vehicle M and feedback control based on deviation from the target trajectory.

The HMI controller 170 notifies the occupant of prescribed information through the HMI 30. The prescribed information includes, for example, information about traveling of the vehicle M such as information about the state of the vehicle M and information about driving control. The information about the state of the vehicle M includes, for example, a speed, an engine speed, a shift position, and the like of the vehicle M. Information about driving control includes, for example, an inquiry as to whether or not to change lanes, whether or not to execute a driving mode, information about a change of the driving mode, and information imposed on the occupant necessary for switching the driving mode (task request information for the occupant), information about a situation of driving control (for example, content of the driving mode being executed), and the like. The prescribed information may include information irrelevant to travel control of the vehicle M, such as content (for example, movies) stored in a storage medium such as a TV program or a DVD. The prescribed information may include, for example, a current position or a destination of the vehicle M, information about the remaining amount of fuel, and the like.

For example, the HMI controller 170 may generate an image including the prescribed information described above, cause the display device of the HMI 30 to display the generated image, generate a sound indicating the prescribed information, and cause the generated sound to be output from a speaker of the HMI 30. The HMI controller 170 may cause the communication device 20, the navigation device 50, the first controller 120, and the like to output information received by the HMI 30.

The travel driving force output device 200 outputs a travel driving force (torque) for enabling the traveling of the vehicle to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. Also, the brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operation element 80 to change the direction of the steerable wheels.

[Region Setter 152, Determiner 153, and Mode Change Processor 154]

Specific processing content of the region setter 152, the determiner 153, and the mode change processor 154 will be described below. Hereinafter, it is assumed that the driver state determiner 151 determines that the occupant is appropriately performing the task imposed in accordance with the driving mode. When the driver state determiner 151 determines that the occupant is not executing the task imposed in accordance with the mode, the mode decider 150 decides to make a change to the mode corresponding to the task being executed by the occupant or decides to perform control for stopping automated driving. The mode change processor 154 may change the mode in accordance with, for example, a surrounding situation recognized by the recognizer 130 (for example, behavior of other vehicles, other road situations, and the like).

[Setting of Specific Region]

Figure 4:
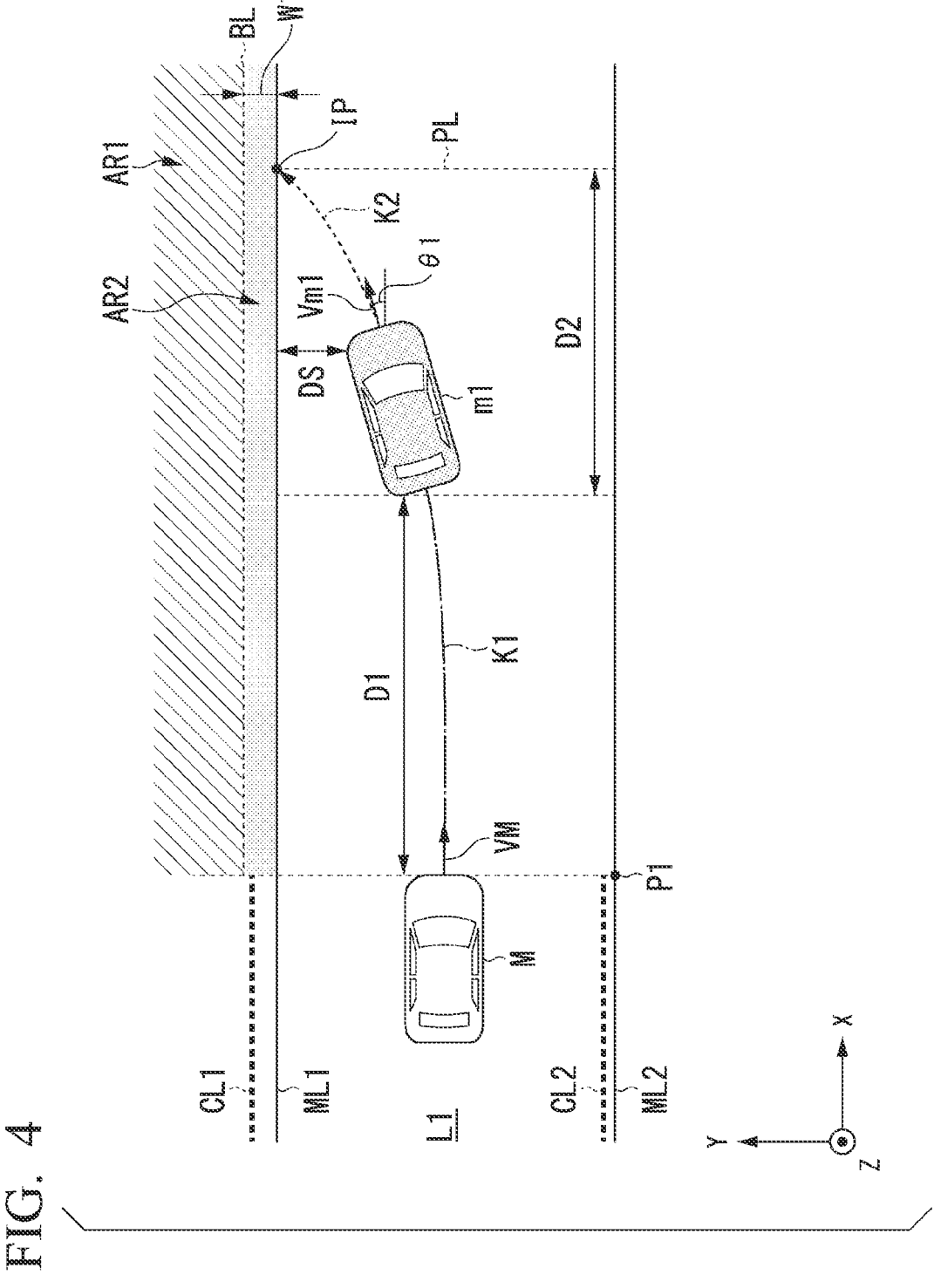
FIG. 4 is a diagram for describing an example of a process of a region setter.

FIG. 4 is a diagram for describing an example of a process of the region setter 152. In the example of FIG. 4, the vehicle M is traveling at a speed VM in a lane L1 extending in a prescribed direction (the X-axis direction in FIG. 4). Lane L1 is defined by camera markings CL1 and CL2 recognized by the first recognizer 132 or map markings ML1 and ML2 recognized by the second recognizer 134 from the map information (the first map information 54 and the second map information 62). In FIG. 4, another vehicle m1 is a preceding vehicle traveling in front of the vehicle M at a speed Vm1 (hereinafter, the other vehicle m1 will be referred to as a "preceding vehicle m1"). At the time shown in FIG. 4, it is assumed that the vehicle M is executing driving control in the first driving mode. For example, in a case where the camera markings CL1 and CL2 match the map markings ML1 and ML2 as a case where the first recognizer 132 recognizes the camera markings CL1 and CL2 located on the left and right sides of the vehicle M, the mode change processor 154 decides to execute (continue) the first driving mode based on the map markings. In this case, the action plan generator 140 generates a target trajectory along which a reference position (for example, a center or a center of gravity) of the vehicle M passes through a center of the lane L1 (on a lane centerline). In this case, the target trajectory may be adjusted on the basis of the camera markings CL1 and CL2. The action plan generator 140 may generate a target trajectory that passes through the camera markings CL1 and CL2. LKAS control is executed by causing the vehicle to travel along this target trajectory.

For example, when the first recognizer 132 does not recognize the camera markings CL1 and CL2 due to the rubbing of the road markings, the weather, or the like and the camera markings CL1 and CL2 do not match the map markings ML1 and ML2 and when the preceding vehicle m1 can be recognized, the mode change processor 154 executes (continues) the first driving mode on the basis of the map markings ML1 and ML2 recognized by the second recognizer 134 and a travel trajectory K1 of the preceding vehicle m1. In this case, the action plan generator 140 generates a target trajectory along which the reference position of the vehicle M travels on the travel trajectory K1. Tracking travel control is executed by causing the vehicle to travel along this target trajectory. The vehicle M continues the tracking travel control by designating the preceding vehicle m1 as a tracking target until the preceding vehicle m1 crosses the map marking ML1 or ML2 and exits the lane L1.

The mode decider 150 may calculate a margin for the vehicle M to continue traveling in the first driving mode and cause the tracking travel control in the first driving mode to continue until the calculated margin is less than a threshold value. In this case, the mode decider 150 identifies an intersection point IP between the map marking ML1 and an extension line (future travel trajectory) K2 predicted from the travel trajectory K1 of the preceding vehicle m1 and the speed of the preceding vehicle m1. The mode decider 150 calculates the margin P as "P=(D1+D2)/VM" on the basis of a distance D1 from the vehicle M to the preceding vehicle m1, a distance D2 from the preceding vehicle m1 to a line PL (a line passing through the intersection point IP and perpendicular to the map marking ML1), and the speed VM of the vehicle M.

The mode decider 150 switches the driving mode to the second driving mode or the manual driving mode, for example, in a situation in which an execution condition of the LKAS control and an execution condition of the tracking travel control are not satisfied. For example, the mode decider 150 may switch the driving mode to the second driving mode when the preceding vehicle recognized by the first recognizer 132 is no longer recognized due to a lane change or the like during the execution of the first driving mode (when there is no preceding vehicle) and may switch the driving mode to the manual driving mode when the state of the second driving mode continues for a prescribed period of time or longer. Thereby, it is possible to provide driving assistance in which the degree of automation of driving control (a task imposed on the occupant) is adjusted step by step without suddenly switching driving to manual driving.

Here, because the map markings are road markings acquired from the map information on the basis of the position information of the vehicle M, the road markings are likely to be different from actual road markings, for example, according to an error in the position of the vehicle M, the accuracy of the map, or the like. Because the recognition accuracy of the detection device DD is lower when the position is farther from the vehicle M, the position accuracy of the preceding vehicle m1 also decreases. Thus, as described above, there is a possibility that the determination of whether the preceding vehicle m1 has crossed the map marking and the calculation of the margin will not be appropriately performed, switching of appropriate driving control will not be performed, and appropriate driving assistance will not be provided to the occupant of the vehicle M. Therefore, the region setter 152 of the embodiment sets a specific region based on the position of the map marking. Also, the determiner 153 determines whether or not there is interference between the specific region and the position of the preceding vehicle m1 and executes driving control of the vehicle M on the basis of a determination result.

Although the specific region AR1 based on the position of the map marking ML1 closer to the preceding vehicle m1 (or in the travel direction of the preceding vehicle m1) between the map markings ML1 and ML2 is set in the example of FIG. 4, a specific region based on the position of the other map marking ML2 may also be set. For example, the region setter 152 sets a boundary line BL at a position that is located outside (away from) the map marking ML1 when viewed from the vehicle M and is a width W1 away from the map marking ML1 in the road width direction (the Y-axis direction in the drawing) and sets a region located further away from the boundary line BL as a specific region AR1. The width W1 may be, for example, a fixed value or a variable value according to the road shape, the speed VM of the vehicle M, or the like, and may be set on the basis of the recognized position of the camera marking CL1.

In addition to the specific region AR1, the region setter 152 may set a region AR2 defined by the boundary line BL and the map marking ML1 as an allowable region (a dead zone). For example, when there is an error between the map marking and the actual road marking or even if the preceding vehicle m1 crosses the road marking ML1, because there is a possibility that it will immediately return to the lane L1, the allowable region is set as a region where the continuation of a current driving mode (for example, the first driving mode) is allowed (switching is not performed). Thereby, the current traveling can be continued and stable driving control can be executed.

The region setter 152, for example, may set the specific region AR1 (and the allowable region AR2) in the travel direction of the vehicle M from a point P1 where the camera markings CL1 and CL2 are no longer recognized and may set the specific region AR1 (and the allowable region AR2) including a point where the camera markings CL1 and CL2 are recognized. When a shortest distance DS between the preceding vehicle m1 and the map marking ML1 is within a prescribed distance, the region setter 152 sets the specific region AR1 (and the allowable region AR2) in the travel direction ahead of the preceding vehicle m1. At least a part of the specific region AR1 and the allowable region AR2 may be set inside of the lane L1 (on the lane center side thereof).

When the camera markings CL1 and CL2 are not recognized by the first recognizer 132 and the preceding vehicle m1 is recognized, the determiner 153 determines whether or not there is interference between the specific region AR1 and the reference position (for example, the front end or the center) of the preceding vehicle m1. For example, the determiner 153 determines that there is interference between the preceding vehicle m1 and the specific region AR1 when at least a part of the preceding vehicle m1 is located in the specific region AR1. The determiner 153 may calculate a margin in the relationship between the preceding vehicle m1 and the specific region AR1 and determine that there is interference between the preceding vehicle m1 and the specific region AR1 when the margin is less than a threshold value. In this case, the intersection point IP between the specific region AR1 and the extension line (the future travel trajectory) K2 predicted from the travel trajectory K1 of the preceding vehicle m1 and the speed of the preceding vehicle m1 is identified and a margin P is calculated as described above.

The determiner 153 may determine that there is interference between the preceding vehicle m1 and the specific region AR1 when the preceding vehicle m1 is predicted to enter the specific region AR1 within a prescribed period of time on the basis of a shortest distance between the preceding vehicle m1 and the specific region AR1, the speed Vm1 of the preceding vehicle m1, and a deviation angle direction $\theta 1$ formed by the extension direction of the map marking ML1 and the travel direction of the preceding vehicle m1.

When the determiner 153 determines that there is interference between the preceding vehicle m1 and the specific region AR1, the mode change processor 154 changes the driving mode of the vehicle M from the first driving mode to the second driving mode. In the above-described process, more appropriate driving assistance can be provided to the occupant.

The determiner 153 may determine whether or not there is interference between the allowable region AR2 and the position of the preceding vehicle m1 using the allowable region AR2 instead of the specific region AR2. When it is determined that there is interference between the allowable region AR2 and the preceding vehicle m1, for example, the HMI controller 170 provides a notification to the vehicle M by outputting information indicating that there is a possibility that the preceding vehicle m1 will no longer be recognized as a tracking target or there is a possibility that the driving mode (the first driving mode) being executed will be switched. Thereby, the occupant can ascertain that there is a possibility that the driving mode will be switched. When interference between the allowable region AR2 and the preceding vehicle m1 continues for a prescribed period of time or longer, the mode change processor 154 may change the driving mode of the vehicle M from the first driving mode to the second driving mode. As described above, when the preceding vehicle m1 is also continuously present for a prescribed period of time or longer in the allowable region AR2, driving control with higher safety can be executed by switching the driving mode.

Furthermore, because the accuracy of recognition of the position of the preceding vehicle m1 decreases as an inter-vehicle distance between the vehicle M and the preceding vehicle m1 increases, the region setter 152, for example, variably sets a width of at least a part of the specific region (for example, a width in a lateral direction of the lane or a width in a width direction of the lane) in accordance with an inter-vehicle distance (a longitudinal distance) between the vehicle M and the preceding vehicle m1.

Figure 5:
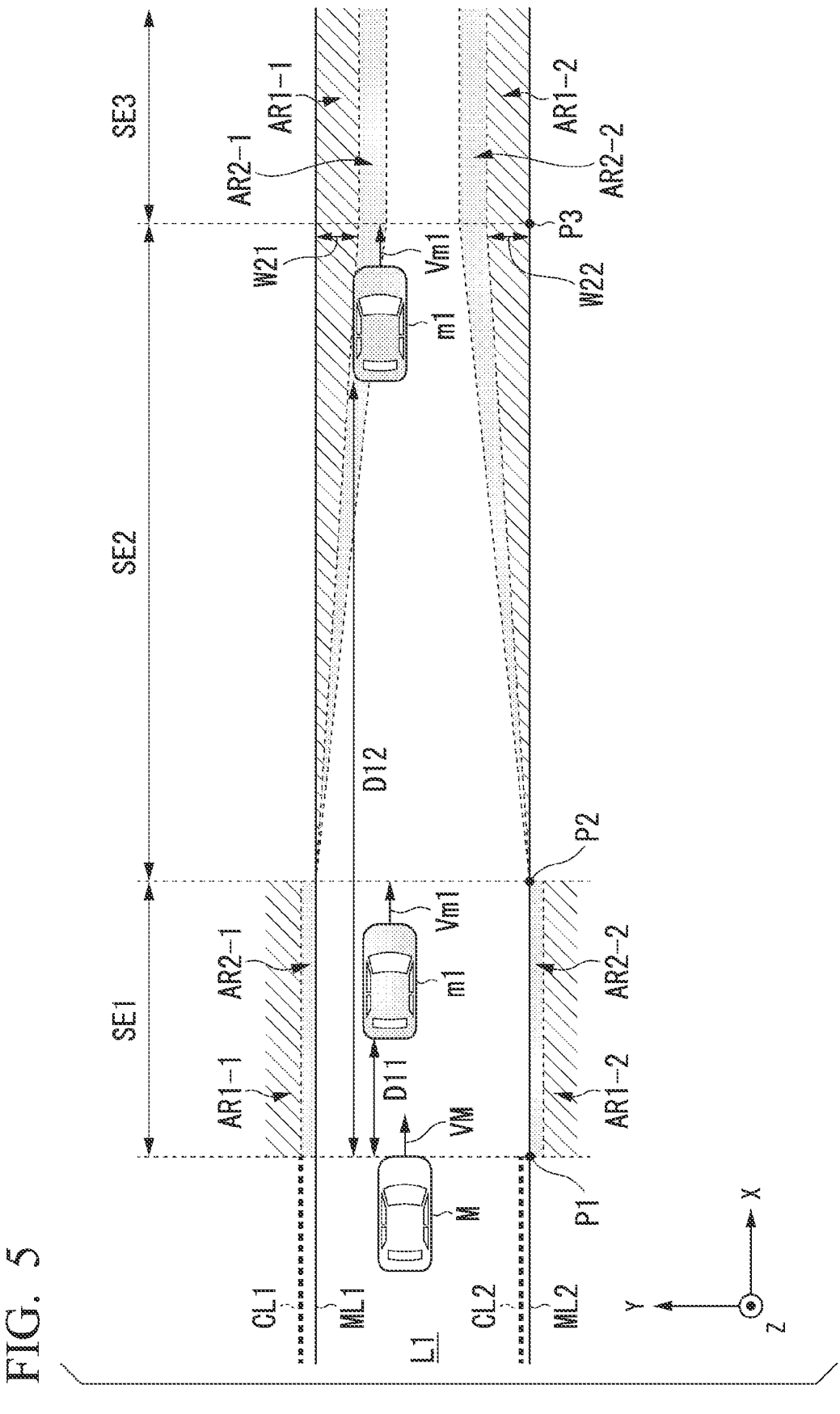
FIG. 5 is a diagram for describing a process of variably setting a specific region.

FIG. 5 is a diagram for describing a process of variably setting the specific region. In the example of FIG. 5, as in FIG. 4, the vehicle M traveling in the lane L1 at the speed VM and the preceding vehicle m1 traveling at the speed Vm1 are shown. In the example of FIG. 5, a case where the preceding vehicle m1 is located within a segment SE1 between points P1 and P2 and a case where the preceding vehicle m1 is located within a segment SE2 between points P2 and P3 are shown with respect to the position of the vehicle M. The segment SE3 is a segment far from the vehicle M with the point P3 as the starting point.

When the vehicle M is at the point P1 and camera markings CL1 and CL2 are no longer recognized by the first recognizer 132, the region setter 152 sets the specific region AR1 on the basis of positions of map markings ML1 and ML2. In the example of FIG. 5, specific regions AR1-1 and AR1-2 based on the two map markings ML1 and ML2 defining the lane L1 are set. The region setter 152 sets allowable regions AR2-1 and AR2-2 inside of the specific regions AR1-1 and AR1-2 (on the lane center side thereof).

Here, because it can be determined that there is no deterioration in recognition accuracy due to the detection device DD or the like at the distance to the segment SE1 based on the current position of the vehicle M, the specific region AR1 and the allowable region AR2 are set outside of the lane L1 on the basis of positions of the map markings ML1 and ML2 as shown in FIG. 4 described above. Because the recognition accuracy of the detection device or the like is predicted to deteriorate in accordance with the distance from the vehicle M in the segment SE2 in front of the point P2, the region setter 152 sets the specific regions AR1-1 and AR1-2 so that widths W21 and W22 increase toward an inner side of the map markings ML1 and ML2 (the center side of the lane L1) as the inter-vehicle distance between the vehicle M and the preceding vehicle m1 increases (in other words, as the distance from the vehicle M increases). An amount of change (increase) of each of the widths W21 and W22 may be a fixed value or may be variably set on the basis of a road shape.

The region setter 152 also sets the allowable regions AR2-1 and AR2-2 in the segment SE2 so that the width increases toward an inner side of the map markings ML1 and ML2 as the inter-vehicle distance between the vehicle M and the preceding vehicle m1 increases (in other words, as the distance from the vehicle M increases).

When the width of the specific region AR1 or the like continuously increases as the distance from the vehicle M increases, the region setter 152 may make the widths W21 and W22 uniform in a segment in front of the segment SE2 because it is determined that the preceding vehicle m1 will interfere with the specific region AR1 even if the preceding vehicle m1 is traveling near the center of the lane L1. Although the discontinuous specific region AR1 and the allowable region AR2 are set in the segment SE1 and the segment SE2 in the example of FIG. 5, the specific region AR1 and the allowable region AR2 may be set continuously from the region set in the segment SE1. In this case, the specific region AR1 and the allowable region AR2 are set from the outer side to the inner side of the lane.

Figure 6:
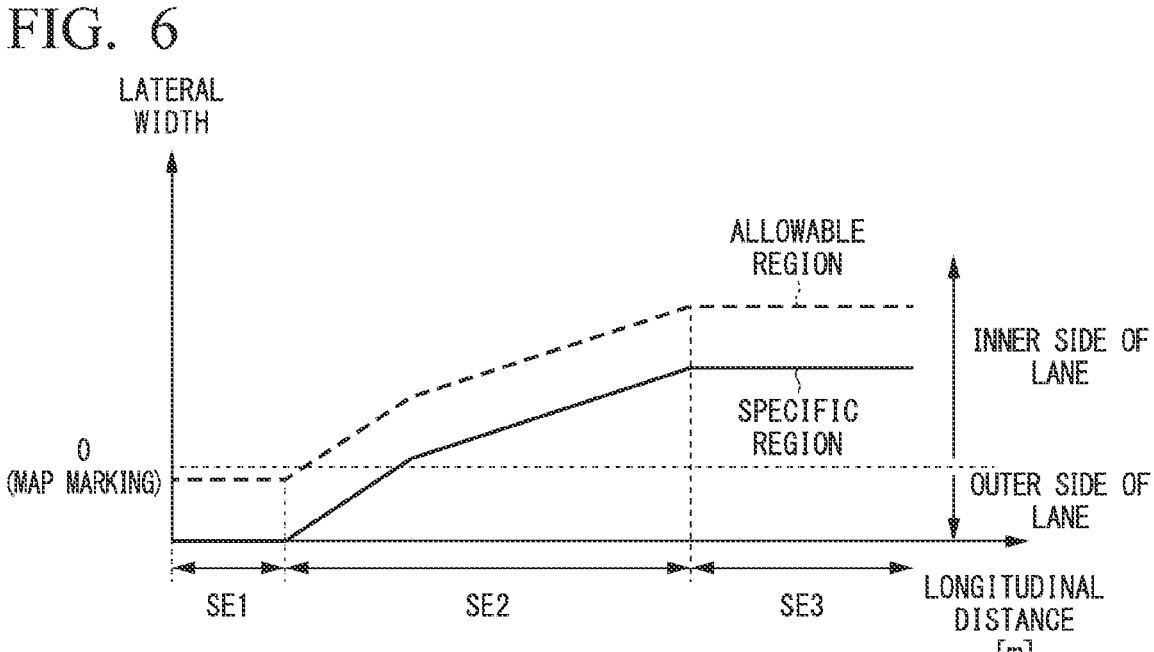
FIG. 6 is a diagram showing an example in which widths of a specific region and an allowable region corresponding to a distance are set.

FIG. 6 is a diagram showing an example in which widths of the specific region and the allowable region correspond-ing to the distance are set. In the example of FIG. 6, the horizontal axis represents a distance (a longitudinal dis-tance) from the vehicle M in the extension direction of the travel lane (or travel road) of the vehicle M and the vertical axis represents a lateral width of each of the specific region and the allowable region. Furthermore, in the example of FIG. 6, the position on the map marking is set to 0 (zero), a width outside of the travel lane L1 is indicated by a negative value with respect to the map marking and a width of an inner side (the center side of the lane) is indicated by a positive value. Although the segments SE1 to SE3 shown in FIG. 6 are segments similar to those of FIG. 5, a case where a continuous specific region AR1 and an allowable region AR2 are set in the segments SE1 to SE3 in the case of FIG. 6 is shown. A slope of the line segment in FIG. 6 indicates an amount of change in a lateral width.

As shown in FIGS. 5 and 6, an amount of change in width increases linearly with a distance. The amount of change in width may be increased nonlinearly (for example, stepwise) instead of linearly and may be decided on using a prescribed function for outputting the amount of change in the width of the specific region by inputting the distance from the vehicle M. The widths W21 and W22 for the specific regions AR1-1 and AR1-2 may have the same amount of change or may have different amounts of change.

Thereby, as the inter-vehicle distance between the vehicle M and the preceding vehicle m1 increases, it is easily determined that there is interference between the preceding vehicle m1 and the specific region AR1. For example, in the example of FIG. 5, the first driving mode is continued because the preceding vehicle m1 does not interfere with the specific region AR1 in the segment SE1 where the inter-vehicle distance between the vehicle M and the preceding vehicle m1 is a distance D11. On the other hand, because the preceding vehicle m1 interferes with the specific region AR1 in the segment SE2 where the inter-vehicle distance between the vehicle M and the preceding vehicle m1 is a distance D12, control for switching the driving mode to the second driving mode is executed. Thereby, because it is possible to determine an early level-down process (a process of switch-ing to a mode with a low degree of automation of driving control (a mode in which a task imposed on the occupant is heavier)) when the preceding vehicle m1 is located at a position where the recognition accuracy deteriorates, it is possible to provide the occupant with more appropriate driving assistance.

Figure 7:
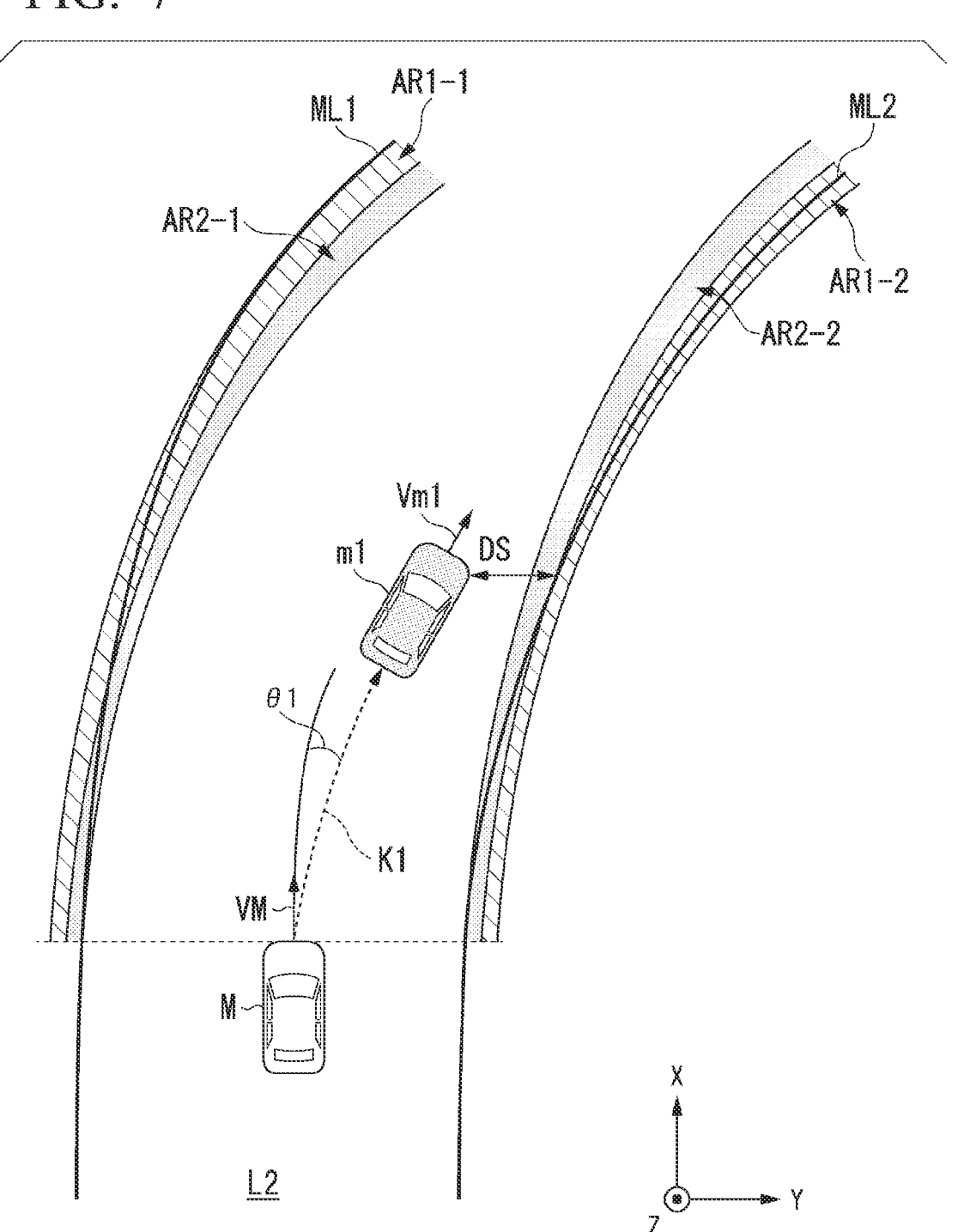
FIG. 7 is a diagram for describing the process of variably setting the specific region on the basis of curvature of a road where the vehicle travels.

The region setter 152 may variably set a width of at least a part of a specific region on the basis of curvature of a road instead of (or in addition to) the above-described inter-vehicle distance between the vehicle M and the preceding vehicle m1. FIG. 7 is a diagram for describing that the specific region is variably set on the basis of the curvature of the road where the vehicle M travels. In the example of FIG. 7, it is assumed that the vehicle M is traveling in a lane L2 having prescribed curvature at a speed VM and the preceding vehicle m1 is traveling in front of the vehicle M at a speed Vm1. In the example of FIG. 7, it is assumed that the vehicle M cannot recognize the camera markings and the first driving mode is being executed so that a reference position of the vehicle M passes through the travel trajectory K1 on the basis of the travel trajectory K1 of the preceding vehicle m1 and the map markings ML1 and ML2.

For example, the region setter 152 acquires the curvature of the lane L1 from the map information and sets widths of the specific regions AR1-1 and AR1-2 and the allowable regions AR2-1 and AR2-2 to be further widened in accor-dance with a magnitude of curvature when the acquired curvature is greater than or equal to a threshold value. When the curvature of each of the map markings ML1 and ML2 can be acquired instead of the curvature of the entire lane L2

(road), the region setter 152 may set the specific region AR1 and the allowable region with different amounts of change on the basis of curvature. The region setter 152 may variably set the widths of the specific regions AR1-1 and AR1-2 and the allowable regions AR2-1 and AR2-2 in accordance with a radius of curvature instead of the curvature.

In the example of FIG. 7, in addition to the change in width corresponding to the curvature, the specific regions AR1-1 and AR1-2 and the allowable regions AR2-1 and AR2-2 are set so that the width between the map markings ML1 and ML2 is continuously widened from the outer side to the inner side of the map markings ML1 and ML2 as the distance from the vehicle M increases (the inter-vehicle distance between the vehicle M and the preceding vehicle m1 increases). In the example of FIG. 7 as well, the region setter 152 may set the segments SE1 to SE3 as shown in FIG. 5 and set a fixed-width region and a variable-width region in the set segments.

On the basis of information about behavior of the preceding vehicle m1, the region setter 152 may variably set a width of at least one of the specific region AR1 and the allowable region AR2 so that the preceding vehicle m1 is executed from the tracking target at an early stage (so that the preceding vehicle m1 is no longer recognized as a preceding vehicle). The information about the behavior is, for example, at least one of a deviation angle θ1 between the map marking and the travel trajectory K1 of the preceding vehicle m1 or a shortest distance DS between the map marking and the preceding vehicle m1.

Figure 8:
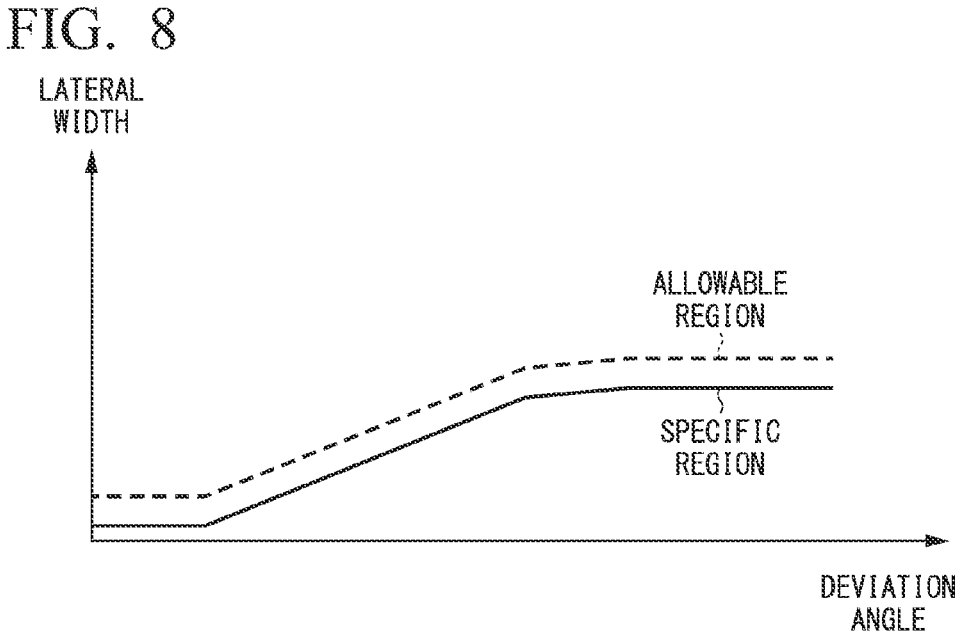
FIG. 8 is a diagram showing lateral widths of the specific region and the allowable region based on a deviation angle between an extension direction of a map marking and a travel direction of a preceding vehicle.

FIG. 8 is a diagram showing the lateral widths of the specific region and the allowable region based on the deviation angle θ1 between the extension direction of the map marking and the travel direction of the preceding vehicle m1. In the example of FIG. 8, the horizontal axis represents the deviation angle θ1 between the extension direction of the map marking ML and the travel direction of the travel trajectory K1 of the preceding vehicle m1 and the vertical axis represents a width of each of the specific region and the allowable region. In the example of FIG. 8, the width in the inward direction (the lane center direction) of the travel lane is shown. For example, because the possibility that a recognition result of the detection device DD or the recognition control of the host vehicle position will deteriorate increases as the deviation angle θ1 increases, the region setter 152 can exclude the preceding vehicle m1 from the tracking target at an early stage by widening the width of the specific region or the allowable region to an inner side of the lane as shown in FIG. 8 and determine an early level-down process (a process of switching to a mode with a low degree of automation of driving control (a mode in which a task imposed on the occupant is heavier)).

The region setter 152, for example, further expands the width of each of the specific region and the allowable region toward the inside of the lane when the shortest distance DS is shorter, thereby excluding the preceding vehicle m1 from the tracking target at an early stage and performing an early level-down determination.

Even if the preceding vehicle m1 is no longer recognized as the tracking target during the execution of the first driving mode based on the travel trajectory of the preceding vehicle m1 and the map markings, the mode decider 150 may continue the first driving mode based on the travel trajectory of the other vehicle and the map markings when the first recognizer 132 recognizes the presence of the other vehicle that is the other tracking target. Thereby, the continuation rate of the driving mode being executed can be improved.

The mode decider 150 may execute the first driving mode based on the map markings and the travel trajectory of the preceding vehicle m1 when the camera marking is not recognized by the first recognizer 132 and the preceding vehicle m1 is recognized as described above, but may switch the driving mode to the first driving mode based on the camera markings when the camera markings can be recognized by the first recognizer 132 during the execution of the above-described first driving mode. Thereby, it is possible to execute the driving control based on the actual situation detected by the detection device DD while ensuring the continuity of the driving mode being executed.

[Processing Flow]

A process executed by the automated driving control device 100 of the embodiment will be described below. Hereinafter, processes of the recognizer 130 and the mode decider 150 among processes executed by the automated driving control device 100 will be mainly described. The processing to be described below may be iteratively executed at prescribed timings or prescribed intervals, for example, while an automated driving process of the automated driving control device 100 is being executed.

Figure 9:
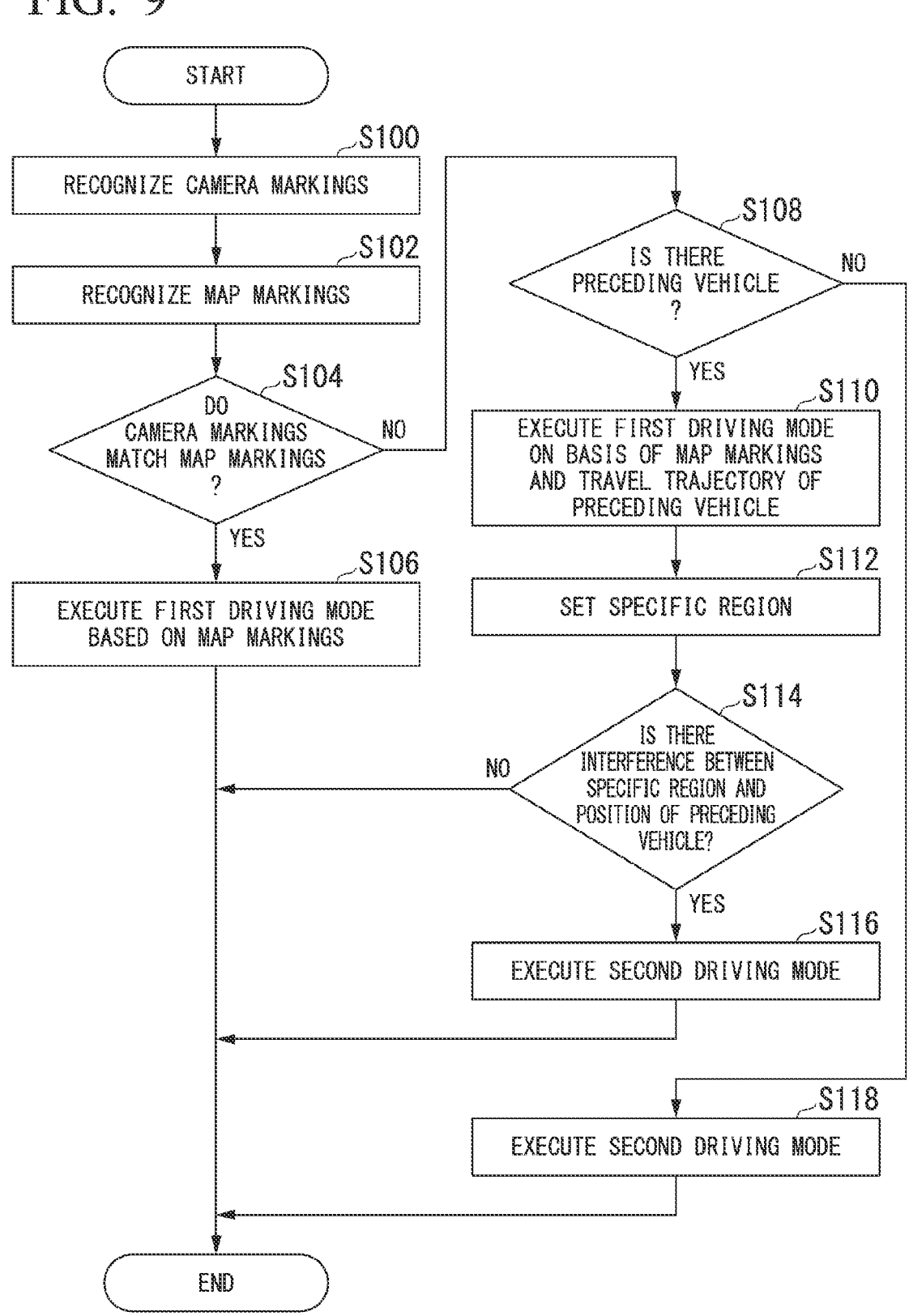
FIG. 9 is a flowchart showing an example of a flow of a process executed by an automated driving control device of the embodiment.

FIG. 9 is a flowchart showing an example of the process executed by the automated driving control device 100 of the embodiment. In the example of FIG. 9, the first recognizer 132 recognizes camera markings on the basis of information input by the detection device DD (step S100). Subsequently, the second recognizer 134 recognizes map markings on the basis of position information of the vehicle M and map information (the first map information 54 and the second map information 62) (step S102).

Subsequently, the mode decider 150 determines whether or not the camera markings match the map markings (step S104). When it is determined that they match, the mode decider 150 executes (or continues) the first driving mode based on the map markings (step S106). In this case, the action plan generator 140 generates a target trajectory so that the vehicle M passes through the lane centerline included in the map information. For example, when the camera markings are not recognized by the first recognizer 132 and it is determined that the camera markings do not match the map markings in the processing of step S104, the mode decider 150 determines whether or not the preceding vehicle is located in front of the vehicle M (whether or not the first recognizer 132 has recognized the preceding vehicle in front of the vehicle M) (step S108). When it is determined that the preceding vehicle is present, the mode decider 150 executes (or continues) the first driving mode based on the map markings and the travel trajectory of the traveling vehicle (step S110).

Subsequently, the region setter 152 of the mode decider 150 sets a specific region (step S112). Subsequently, the determiner 153 of the mode decider 150 determines whether or not there is interference between the specific region and the preceding vehicle (step S114). When it is determined that there is interference between the specific region and the position of the preceding vehicle, the mode decider 150 executes the second driving mode (step S116). When it is determined that there is no preceding vehicle in the processing of step S108, the mode decider 150 executes the second driving mode (step S118). Thereby, the process of the present flowchart ends. When it is determined that there is no interference between the specific region and the position of the preceding vehicle in the processing of step S114, the first driving mode is continued.

According to the embodiment described above, there is provided a vehicle control device including: a first recognizer 132 configured to recognize a surrounding situation of a vehicle M including a first marking relating to a travel lane of the vehicle M and a nearby vehicle around the vehicle M on the basis of an output of a detection device DD that detects the surrounding situation of the vehicle M; a second recognizer 134 configured to recognize a second marking relating to a lane near the vehicle M from map information on the basis of position information of the vehicle M; a driving controller configured to control one or both of steering and a speed of the vehicle M on the basis of recognition results of the first recognizer 132 and the second recognizer 134; and a mode decider 150 configured to decide on a driving mode of the vehicle M as any one of a plurality of driving modes including a first driving mode and a second driving mode having a heavier task imposed on an occupant of the vehicle M than the first driving mode, wherein some of the plurality of driving modes including at least the first driving mode are controlled by the driving controller, wherein the mode decider 150 determines whether or not there is interference between a specific region set on the basis of the second marking recognized by the second recognizer 134 and a position of the preceding vehicle when the first recognizer 132 recognizes the preceding vehicle traveling in front of the vehicle M without recognizing the first marking, and changes the driving mode from the first driving mode to the second driving mode when determining that the preceding vehicle interferes with the specific region, and wherein a width of at least a part of the specific region is variably set in accordance with at least one of an inter-vehicle distance between the vehicle M and the preceding vehicle and curvature of a road where the vehicle M travels, whereby it is possible to provide the occupant of the vehicle with more appropriate driving assistance in accordance with a surrounding situation. Therefore, it is possible to contribute to the development of sustainable transportation systems.

Specifically, according to the embodiment, for example, when the camera markings cannot be recognized and the camera markings do not match the map markings, and when there is a preceding vehicle, it is possible to determine the certainty of the position of the vehicle M on the basis of whether or not there is interference between the position of the preceding vehicle and the map marking. At this time, a specific region and an allowable region are set for determining interference between the preceding vehicle and the map marking. However, because the positional accuracy deteriorates according to the inter-vehicle distance between the preceding vehicle and the vehicle M (the distance from the vehicle M) and the curvature of the road, it is possible to determine the early level-down process and switch the driving mode to a more appropriate driving mode by widening the specific region to facilitate interference under such situations. According to the embodiment, for example, even if the camera markings cannot be recognized and the camera markings do not match the map markings, a continuation rate of LKAS control can be improved and the early level-down process can be performed under situations in which the estimation of a position of the vehicle M is likely to be significantly different.

The embodiment described above can be represented as follows.

A vehicle control device including:

a storage medium storing computer-readable instructions; and a processor connected to the storage medium, the processor executing the computer-readable instructions to:

recognize a surrounding situation of a vehicle including a first marking relating to a travel lane of the vehicle and a nearby vehicle around the vehicle on the basis of an output of a detection device that detects the surrounding situation of the vehicle;

recognize a second marking relating to a lane near the vehicle from map information on the basis of position information of the vehicle;

perform driving control for controlling one or both of steering and a speed of the vehicle on the basis of recognition results;

decide on a driving mode of the vehicle as any one of a plurality of driving modes including a first driving mode and a second driving mode having a heavier task imposed on an occupant of the vehicle than the first driving mode, wherein some of the plurality of driving modes including at least the first driving mode are controlled in the driving control;

determine whether or not there is interference between a specific region set on the basis of the second marking and a position of the preceding vehicle when the first marking is not recognized and the preceding vehicle traveling in front of the vehicle is recognized; and change the driving mode from the first driving mode to the second driving mode when determining that the preceding vehicle interferes with the specific region, wherein a width of at least a part of the specific region is variably set in accordance with at least one of an inter-vehicle distance between the vehicle and the preceding vehicle and curvature of a road where the vehicle travels.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:

a processor that executes instructions to:

as a first recognition process, recognize a surrounding situation of a vehicle including a first marking relating to a travel lane of the vehicle and a nearby vehicle around the vehicle on a basis of an output of a detection device that detects the surrounding situation of the vehicle;

as a second recognition process, recognize a second marking relating to a lane near the vehicle from map information on a basis of position information of the vehicle;

control one or both of steering and a speed of the vehicle on a basis of recognition results of the first recognition process and the second recognition process;

decide on a driving mode of the vehicle as any one of a plurality of driving modes including a first driving mode and a second driving mode having a heavier task imposed on an occupant of the vehicle than the first driving mode, wherein some of the plurality of driving modes including at least the first driving mode are controlled by the processor; determine that there is interference between a specific region that was set on a basis of the second marking recognized by the second recognition process and a position of the preceding vehicle, when the first recognition process recognizes the preceding vehicle traveling in front of the vehicle without recognizing the first marking, resulting in an interference determination; and based on the interference determination, change the driving mode from the first driving mode to the second driving mode, wherein a width of at least a part of the specific region is variably set in accordance with at least one of:

an inter-vehicle distance between the vehicle and the preceding vehicle, or a curvature of a travel lane of the vehicle.

2. The vehicle control device according to claim 1, wherein the width of the at least a part of the specific region is set so that the width becomes wider toward a center of a travel lane of the vehicle as the inter-vehicle distance increases.

3. The vehicle control device according to claim 1, wherein the width of the at least a part of the specific region is set so that the width becomes wider toward a center of a travel lane of the vehicle as curvature of a travel lane of the vehicle increases.

4. The vehicle control device according to claim 1, wherein the width of the at least a part of the specific region is variably set further in accordance with at least one of:

a deviation angle between an extension direction of the second marking and a travel direction of the preceding vehicle, or a shortest distance between the preceding vehicle and the second marking.

5. The vehicle control device according to claim 1, wherein an allowable region is provided between the second marking and the specific region, and wherein the processor further causes the first driving mode to continue when the preceding vehicle is located within the allowable region.

6. The vehicle control device according to claim 5, wherein the processor further causes the vehicle to travel in the second driving mode when a state in which a position of the preceding vehicle is located within the allowable region continues for a prescribed period of time or longer.

7. The vehicle control device according to claim 1, wherein the processor further switches the driving mode to the second driving mode when the preceding vehicle is absent and switches the driving mode to a manual driving mode when a state of the second driving mode has continued for a prescribed period of time or longer.

8. The vehicle control device according to claim 1, wherein the processor executes the first driving mode on the basis of the second marking and a travel trajectory of the preceding vehicle when the first recognition process recognizer recognizes the preceding vehicle without recognizing the first marking, and switches the driving mode to the first driving mode based on the first marking when the first recognition process recognizes the first marking while the first driving mode is being executed.

9. The vehicle control device according to claim 1, wherein the processor continues the first driving mode based on a travel trajectory of another vehicle and the second marking in a case where the other vehicle which is another tracking target is present as a case where the preceding vehicle is not recognized as a tracking target while the first driving mode based on the travel trajectory of the preceding vehicle and the second marking is being executed.

10. The vehicle control device according to claim 1, wherein a driving state in the second driving mode allows transition to the first driving mode when a degree of alignment between the first marking and the second marking is at or above a predetermined level, wherein the first driving mode reduces an amount of operation applied to the steering operation element that performs the steering operation of the vehicle compared to the second driving mode, wherein the processor, when determining that the preceding vehicle does not interfere with the specific region if the degree of alignment between the first marking and the second marking decreases, continues the driving mode in the first driving mode, and when determining that the preceding vehicle interferes with the specific region, transitions the driving mode to the second driving mode.

11. A vehicle control method comprising:

recognizing, by a computer, a surrounding situation of a vehicle including a first marking relating to a travel lane of the vehicle and a nearby vehicle around the vehicle on a basis of an output of a detection device that detects the surrounding situation of the vehicle;

recognizing, by the computer, a second marking relating to a lane near the vehicle from map information on a basis of position information of the vehicle;

performing, by the computer, driving control for controlling one or both of steering and a speed of the vehicle on a basis of recognition results;

deciding, by the computer, on a driving mode of the vehicle as any one of a plurality of driving modes including a first driving mode and a second driving mode having a heavier task imposed on an occupant of the vehicle than the first driving mode, wherein some of the plurality of driving modes including at least the first driving mode are controlled in the driving control;

determining, by the computer, that there is interference between a specific region that was set on a basis of the second marking and a position of the preceding vehicle, when the first marking is not recognized and the preceding vehicle traveling in front of the vehicle is recognized, resulting in an interference determination; and based on the interference determination, changing, by the computer, the driving mode from the first driving mode to the second driving mode, wherein a width of at least a part of the specific region is variably set in accordance with at least one of:

an inter-vehicle distance between the vehicle and the preceding vehicle, or a curvature of a travel lane of the vehicle.

12. A computer-readable non-transitory storage medium storing a program for causing a computer to:

recognize a surrounding situation of a vehicle including a first marking relating to a travel lane of the vehicle and a nearby vehicle around the vehicle on a basis of an output of a detection device that detects the surrounding situation of the vehicle;

recognize a second marking relating to a lane near the vehicle from map information on a basis of position information of the vehicle;

perform driving control for controlling one or both of steering and a speed of the vehicle on a basis of recognition results;

decide on a driving mode of the vehicle as any one of a plurality of driving modes including a first driving mode and a second driving mode having a heavier task imposed on an occupant of the vehicle than the first driving mode, wherein some of the plurality of driving modes including at least the first driving mode are controlled in the driving control;

determine that there is interference between a specific region that was set on a basis of the second marking and a position of the preceding vehicle, when the first marking is not recognized and the preceding vehicle traveling in front of the vehicle is recognized, resulting in an interference determination; and based on the interference determination, change the driving mode from the first driving mode to the second driving mode, wherein a width of at least a part of the specific region is variably set in accordance with at least one of:

an inter-vehicle distance between the vehicle and the preceding vehicle, or a curvature of a travel lane of the vehicle.

\* \* \* \* \*